Jan. 31, 1950        J. E. GOLDSTON        2,495,961
PLASTIC DIP TANK
Filed March 13, 1946                2 Sheets-Sheet 1
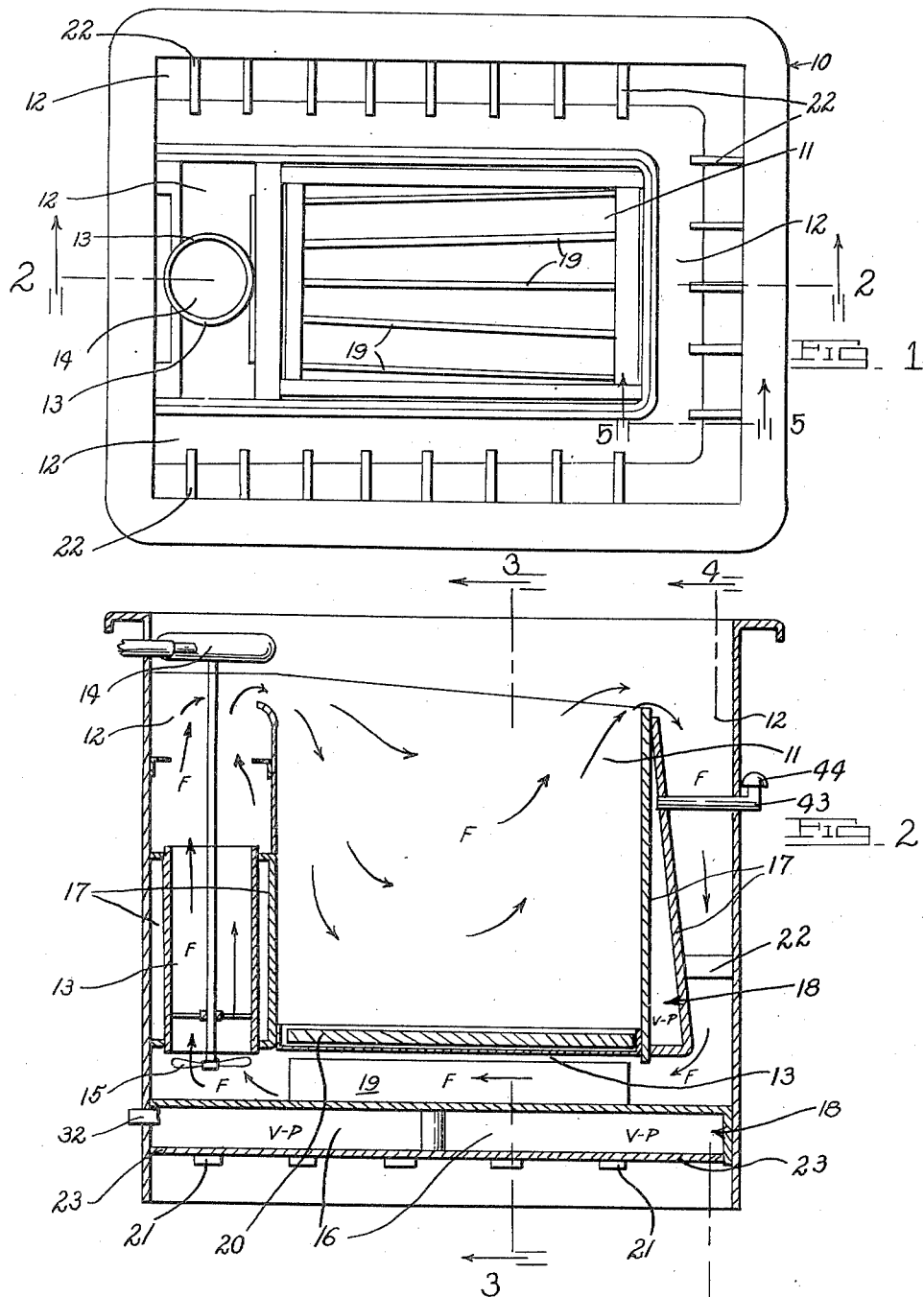
INVENTOR
JOSEPH E. GOLDSTON
BY
ATTORNEY

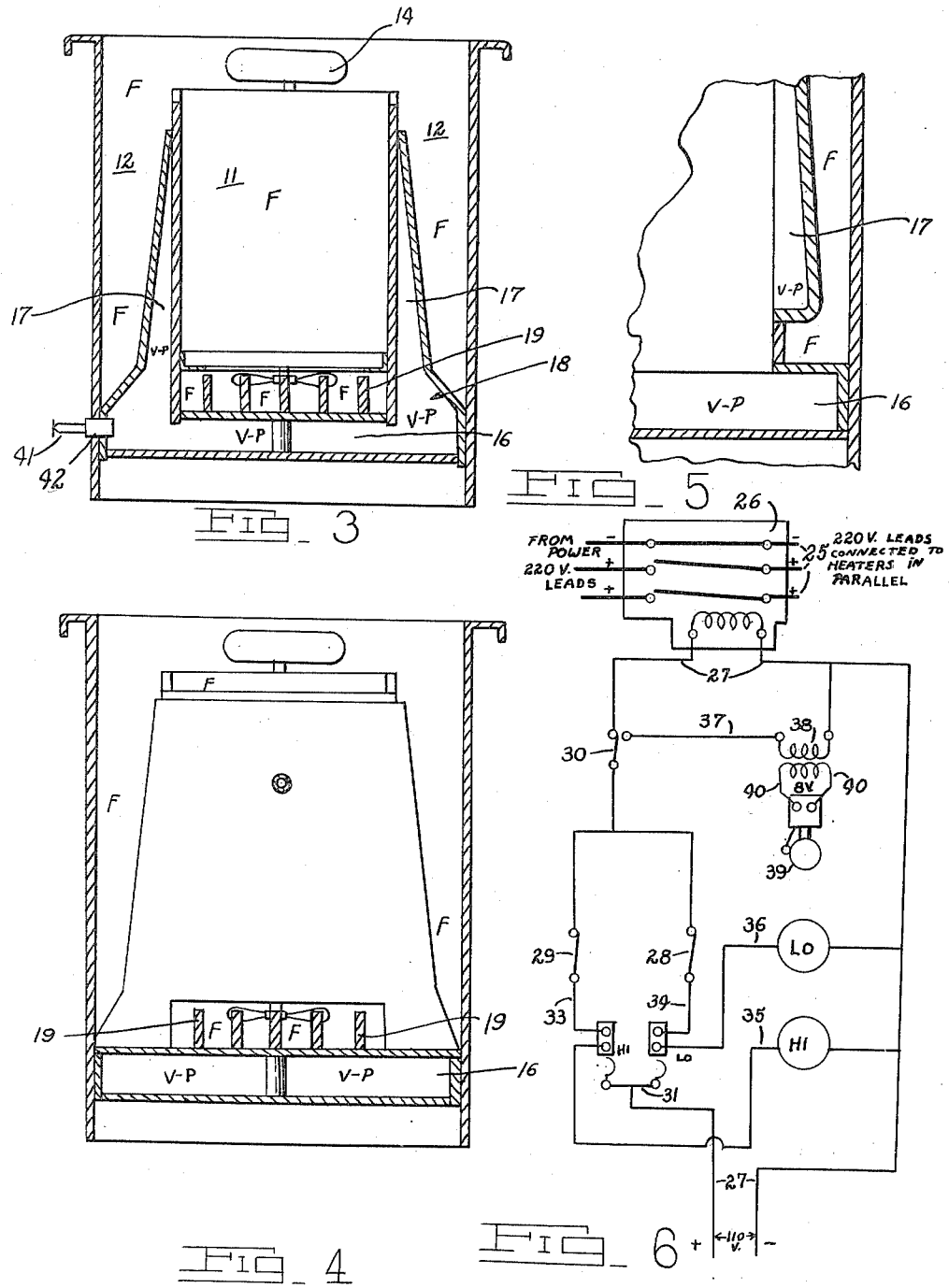

Patented Jan. 31, 1950

2,495,961

UNITED STATES PATENT OFFICE 2,495,961

PLASTIC DIP TANK

Joseph E. Goldston, Toledo, Ohio, assignor to Castaloy Corporation, Detroit, Mich.

Application March 13, 1946, Serial No. 654,172

7 Claims. (Cl. 257—2)

This invention relates generally to plastic dip tanks and more particularly relates to plastic dip tanks used in placing a protective coating on items that are dipped in the tank wherein the tank is filled with a thermo-plastic composition such as ethyl cellulose, caseine butyrate or similar items mixed with waxes, oils or other lubricating ingredients.

In using thermo-plastics, it is necessary to carefully control the temperature at which they are used and to avoid exceeding the critical temperature. For example, in using ethyl cellulose, the operating temperature is between 360° to 395° F. and the critical temperature is 410° F., which, if exceeded, will result in degrading the composition to the point where it is unsuitable for use because it loses its plasticity and becomes brittle.

Also the amount of material that will adhere to a dipped item is dependent on the temperature of the plastic, with thinner coatings adhering at higher temperatures for the same amount of time the item is in the tank. To obtain uniformity in coatings, it is necessary to control the temperatures of the material to within plus or minus 5° F.

Due to the fact that plastics are not good heat conductors and that such plastics as ethyl cellulose, which are most suitable for protective coatings, form a skin adjacent the area of heat application which resists heat induction into the mass, it is difficult to control the heat of the mass within the desired limits with ordinary equipment.

Also if heat application is localized such as in using ordinary gas burners or electric heaters in direct application, the material adjacent the heated area becomes scorched and degraded, which, when mixed with the remainder of the composition, will degrade the whole.

Another difficulty in using ordinary equipment arises in heat control, as the mass of plastic will absorb a large amount of thermal units without a responding rise in temperature, and then the cycle will reverse, and the temperature of the mass will rise out of proportion to the amount of thermal units injected. This feature makes heat control of the mass most difficult although it is most essential.

It is, therefore, an object of this invention to provide a dip tank that is so constructed and equipped that the temperature of the mass of heated plastic can be controlled within 5° F.

Another object is to provide a dip tank that is so heated that the dip composition will not be degraded by the heat application.

Another object is to provide a dip tank that will automatically shut off the application of heat before the plastic exceeds its critical temperature.

Another object is to provide a constant level dip pot.

A further object is to provide a dip tank that will operate automatically in holding the temperature of the composition stable for dipping operation or for idling between dipping operations.

Other objects and advantages will become apparent from the following description and the attached drawings in which:

Fig. 1 is a top view of the dip tank with the false bottom of the dip pot removed;

Fig. 2 is a cross sectional view of the tank with the false bottom in place taken on the line 2—2 of Fig. 1;

Fig. 3 is a cross sectional view of the tank taken on the line 3—3 of Fig. 2;

Fig. 4 is a view similar to Fig. 3 taken on the line 4—4 of Fig. 2 but on reduced scale;

Fig. 5 is an enlarged cross sectional view of a portion of the tank taken on the line 5—5 of Fig. 1; and Fig. 6 is a wiring diagram showing the electrical controls for automatically controlling the temperature of the coating material within the tank.

The dip tank of the present invention is composed of a vapor pressure chamber and a fluid dip vat with the vapor pressure chamber acting as the confining member for the heat transfer agent between the heating element and the plastic in the fluid dip vat. The heat transfer agent is a material which vaporizes upon application of heat with the vapor transmitting the heat. With the vapor under 5 lbs. pressure, heat at 360° F. is transmitted; and with the vapor at 15 lbs. pressure, heat at 400° F. is transmitted.

If heat is applied to ethyl cellulose by a volatile heat transfer agent at 15 lbs. pressure, the temperature of the transfer agent is 400° F. and the temperature of the ethyl cellulose will range between 390° and 395° F. Also, if the transfer agent is at 5 lbs. pressure, the temperature of the transfer agent is 360° F. and temperature of the ethyl cellulose is between 350° and 355° F.

It can thus be seen that the temperature of the dip vat can be controlled by the pressure of the vapor pressure chamber with 15 lbs. pressure suitable for coating purposes in the vat and 5 lbs. pressure suitable for idling the vat with the vat ranging in temperature between 5° and 10° F. less than the chamber.

Ethyl cellulose and the heat transfer agent are herein referred to for purposes of explanation and not by way of limitation as substitutes can be used for both substances with the temperature of the tank controlled by pressure. Also the pressures and corresponding temperatures are subject to adjustment and the pressures and temperatures stated are by way of illustration and not by way of limitation.

Referring to the drawings, the tank 10, Figs.

1 and 2, has a dip pot 11 and a tub 12 surrounding the dip pot 11. Passages 13 in the tub 12 area allow for circulation of the fluid. The dip pot 11, tub 12 and passages 13 comprise the area of the tank 10 that contains the fluid plastic coating material. An air driven motor 14 is equipped with a propeller 15 disposed in the fluid and adapted to circulate the fluid between the dip pot 11 and the tub 12 via the passages 13. A false bottom 20, Fig. 2, positioned in the bottom of the dip pot 11 prevents the escape of the fluid from within the pot 11 or from the passage 13 thereunder into the pot 11. The circulation of the fluid is indicated by the arrows of Fig. 2 with the fluid area also indicated by the letter "F." The air motor is used as increased load due to resistance of the mass of fluid at a low temperature will not injure the motor. However, other types and kinds of motors may be used.

Horizontal portion 16, Figs. 2, 3 and 5 and vertical portions 17 comprise a vapor pressure chamber 18 which is generally indicated by the letters V-P. It can be seen that the horizontal portion 16 is beneath the pot 11 and the tub 12, and that the vertical portions 17 are between the pot 11 and the tub 12. The heat radiation fins 19, Figs. 1 to 4, transmit heat from the horizontal portion 16 of the chamber 18 to the fluid in that portion of the passage 13 that is occupied by the fins 19. This heats the fluid as it comes from the dip pot 11 before it is returned to same by the pump 14. It can now be seen that the dip pot 11 is laterally bounded on three sides and a portion of the fourth side by the vertical portions 17 of the vapor pressure chamber 18, which permits heat to be transmitted to the dip pot 11 directly.

Braces 22, Figs. 1 and 2, support and position the dip pot 11 within the tub 12. The braces 22 are omitted from Figs. 3 and 4 to more clearly show the area occupied by the heat transfer agent and the plastic.

The pump 14, Fig. 2, pumps the fluid plastic from the tub 12 into the dip pot 11, and, as the false bottom 20 is tightly fitted, the fluid plastic spills over the sides of the pot 11 back into the tub 12. Thus the pot 11 has a constant level due to the pump 14 constantly filling the pot 11 irrespective of the level of the plastic in the tub. The false bottom 20 also facilitates cleaning the tank 10 as it can be removed.

The application of heat to the plastic via a vapor medium such as Dowtherm, allows a uniform transmission of heat without any possibility of localizing the heat. Also the temperature can be accurately controlled as the pressure of the vapor can be accurately regulated. The tank 10 in the present invention allows that the localization of heat as applied by the heaters to be absorbed by the heat transfer agent.

Pyrometer 41, Fig. 3, is connected to thermocouple 42 which is disposed in the vapor pressure chamber 18 and indicates to the operator temperature of the chamber 18 independently of other means.

Electric heaters 21, Fig. 2 are positioned on the member 23 which is the bottom of the vapor pressure chamber 18 and which transmits the heat as generated by the heaters to the heat transfer agent, which in turn transmits the heat to the plastic in the dip pot 11 and tub 12 as hereinbefore explained.

Connected to the heaters 21 are 220-v. leads, 25, Fig. 6, and disposed in the leads 25 between the power source, not shown, and the heaters 21 is the electrically operated switch 26 of a type well known to those skilled in the art. Connected to the switch 26 are 110-v. leads 27 and disposed in the leads 27 between the switch 26 and the power source, not shown, are the vapor pressure disconnecting switches 28, 29 and 30, and the selector switch 31. The pressure switch 28 disconnects the 110-v. circuit at 5 lbs. pressure, switch 29 at 15 lbs. pressure and switch 30 at 20 lbs. pressure. The switches 28, 29 and 30 are positioned in the vapor pressure chamber 18 at 32, Fig. 2, and are operated by the vapor pressure therein confined.

The selector switch 31 divides the 110-v. positive lead 27 into circuit 33 and circuit 34. Switch 29 is disposed in circuit 33 and switch 28 is disposed in circuit 34. Switch 30 is disposed in both circuits 33 and 34.

"Hi" and "Lo" pilot light circuits 35 and 36 respectively, are operated by selector switch 31 and indicate which circuit 33 or 34 is in operation to the operator.

The switch 30, upon vapor pressure reaching 20 lbs., closes the circuit 37 thereby powering transformer 38 which in turn powers 8 volt circuit 40. Disposed in the circuit 40 is the bell 39.

The heat transfer agent is fed into the chamber 18 via filler pipe 43, Fig. 2, which also acts as a breather pipe for bleeding the chamber 18 of air. A cap 44 is adapted to close the pipe 43.

In operation, the heat transfer agent is fed into the chamber 18 via the pipe 43 and rests in liquid form on the bottom 23. The leads 25 are connected to power and the leads 27 are connected to power with the selector switch 31 in a neutral position. The tub 12 and dip pot 11 are filled with plastic. The switch 31 is then set in "Hi" position which closes the circuits 33 and 35 in the 110-v. leads 27. This powers the electrically operated switch 26 which closes the circuit in the 220-v. leads 25 thereby powering the heaters 21 and lights the "Hi" pilot light.

The heaters 21 heat the transfer agent which vaporizes forcing the air from the chamber 18 via the pipe 43. When all the air has been bled from the chamber 18, the cap 44 is placed on pipe 43 closing it and sealing the chamber 18 where the transfer agent vaporizes under pressure transmitting heat to the plastic in the tub 12 and dip pot 11 which melts the plastic.

Upon the pressure exceeding 15 lbs. the switch 29 opens disconnecting the circuit 33 which opens switch 26. This keeps the melted plastic at the proper operating temperature of 390° to 395° F.

When it is desirable to idle the plastic, the switch 31 is placed in the "Lo" position which closes the circuits 34 and 36. This powers the switch 26 in the same manner as circuit 33 and lights the "Lo" pilot light. Upon the pressure exceeding 5 lbs., the switch 28 opens disconnecting circuit 34 which opens switch 26 thereby disconnecting the circuit in the 220-v. leads 25. This action keeps the melted plastic idling at the proper temperature of 350° to 355° F.

When the plastic is in melted condition and at operating temperature, the pump 14 is powered which circulates the plastic between the dip pot 11 and the tub 12 and which keeps the dip pot 11 at a constant level.

Should either of the switches 28 or 29 fail to operate, the safety switch 30, disposed in both circuits 33 and 34, will disconnect either circuit 33 or 34 at 20 lbs. vapor pressure thereby opening switch 26 thereby disconnecting the circuit in the 220-v. leads 25. When switch 30 opens either circuit 33 or 34, it closes circuit 37 thereby ringing the warning bell 39 which advises the operator that the tank 10 is in an overheated condition.

The 20 lbs. vapor pressure is equal to 410° F. transfer agent temperature which places the temperature of the plastic between 400° and 405° F. which is at least 5° F. below its critical temperature of 410° F. Thus it can be seen that the dip tank in the present invention is so constructed and equipped that the dip pot has a constant level and that the temperature of the mass of heated plastic can be controlled within 5° F. without degrading the plastic and with the tank operating automatically to control the temperature of the plastic for dipping operations or idling and which will operate automatically to prevent the plastic from reaching its critical temperature.

The tank herein disclosed and the various parts referred to are not by way of limitation as various adaptations, changes, substitutions and omissions can be made without departing from the spirit of the invention and the present invention is limited only by the scope of the appended claims.

I claim:

1. A dip tank consisting of a dip pot, a tub surrounding said dip pot, passages communicating between said pot and said tub, means activating circulation between said pot and said tub via said passages whereby said dip pot is maintained at a constant level, a vapor pressure heating chamber vertically disposed between said tub and said pot and horizontally disposed beneath said tub and said pot, heaters adapted to heat said chamber, and a pressure switch adapted to control said heaters disposed in said chamber and adapted to control the temperature of said chamber via controlling said heaters at a temperature slightly above the operating temperature of the dip material in said dip pot.

2. A dip tank consisting of a dip pot, a tub surrounding said dip pot, passages communicating between said pot and said tub, means activating circulation between said pot and said tub via said passages whereby said dip pot is maintained at a constant level, a vapor pressure heating chamber vertically disposed between said tub and said pot and horizontally disposed beneath said tub and said pot, heaters adapted to heat said chamber, and a pressure switch adapted to control said heaters disposed in said chamber and adapted to control the temperature of said chamber via controlling said heaters at a temperature below the operating temperature of the dip material in said dip pot.

3. A dip tank consisting of a dip pot, a tub surrounding said dip pot, passages communicating between said pot and said tub, means activating circulation between said pot and said tub via said passages whereby said dip pot is maintained at a constant level, a vapor pressure heating chamber vertically disposed between said tub and said pot and horizontally disposed beneath said tub and said pot, heaters adapted to heat said chamber, and a pressure switch adapted to control said heaters disposed in said chamber and adapted to control the temperature of said chamber via controlling said heaters at a temperature below the critical temperature of the dip material in said dip pot.

4. A dip tank consisting of a dip pot, a tub surrounding said dip pot, passages communicating between said pot and said tub, means activating circulation between said pot and said tub via said passages whereby said dip pot is maintained at a constant level, a vapor pressure heating chamber vertically disposed between said tub and said pot and horizontally disposed beneath said tub and said pot, heaters adapted to heat said chamber, a pressure switch adapted to control said heaters disposed in said chamber and adapted to control the temperature of said chamber via controlling said heaters at a temperature slightly above the operating temperature of the dip material in said dip pot, a pressure switch adapted to control said heaters optional with said first pressure switch disposed in said chamber and adapted to control the temperature of said chamber via controlling said heaters at a temperature below the operating temperature of the dip material in said dip pot, and a pressure switch adapted to control said heaters disposed in said chamber and adapted to control the temperature of said chamber via controlling said heaters at a temperature below the critical temperature of the dip material in said dip pot.

5. A dip tank comprising a dip pot, a tub surrounding said pot and said tub having open top surfaces to permit a circulation of fluid from one to the other, means for causing a fluid circulation from said tub to said pot, and a closed vapor pressure heating chamber surrounding said dip pot and within said tub.

6. A dip tank consisting of an open dip pot, a tub surrounding said pot, a closed vapor pressure heating chamber, means reactive to the pressure of said vapor pressure heating chamber for automatically controlling the temperature of said dip pot, passages communicating between said pot and said tub for fluid circulation, and means activating circulation between said pot and said tub, said chamber having a horizontal portion disposed beneath said tub and said pot, and a vertical portion disposed between said tub and said pot.

7. A dip tank consisting of an open dip pot, a tub surrounding said pot, a closed vapor pressure heating chamber, means reactive to the pressure of said vapor pressure heating chamber for automatically controlling the temperature of said dip pot, passages communicating between said pot and said tub for fluid circulation, and means activating circulation between said pot and said tub whereby said dip pot is maintained at a common level, said chamber having a horizontal portion disposed beneath said tub and said pot, and a vertical portion disposed between said tub and said pot, said first means having optional circuits for controlling the temperature of said dip pot at an operating temperature or at an idling temperature.

JOSEPH E. GOLDSTON.

REFERENCES CITED

The following references are of record in the file of this patent:

UNITED STATES PATENTS

| Number | Name | Date |
|---|---|---|
| 316,896 | Hubel et al. | Apr. 28, 1885 |
| 2,055,033 | Kingsland | Sept. 22, 1936 |
| 2,165,364 | Ferngren | July 11, 1939 |
| 2,236,837 | Rimmel | Apr. 1, 1941 |
| 2,357,536 | Morse | Sept. 5, 1944 |
| 2,363,118 | Chamberlain | Nov. 21, 1944 |
| 2,396,578 | Kittel et al. | Mar. 12, 1946 |